United States Patent
Farkash et al.

(10) Patent No.: US 10,148,991 B2
(45) Date of Patent: Dec. 4, 2018

(54) SYSTEM AND METHOD FOR PROVIDING A PRIVATE MOSAIC

(71) Applicant: Cisco Technology, Inc., San Jose, CA (US)

(72) Inventors: Eyal Farkash, Kfar Saba (IL); Ilan Bauminger, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 383 days.

(21) Appl. No.: 14/439,674

(22) PCT Filed: Nov. 5, 2013

(86) PCT No.: PCT/IB2013/059907
§ 371 (c)(1),
(2) Date: Apr. 30, 2015

(87) PCT Pub. No.: WO2014/072901
PCT Pub. Date: May 15, 2014

(65) Prior Publication Data
US 2015/0319473 A1  Nov. 5, 2015

(30) Foreign Application Priority Data
Nov. 7, 2012 (GB) .................................. 1220001.0

(51) Int. Cl.
*H04N 21/2668* (2011.01)
*H04N 21/63* (2011.01)
(Continued)

(52) U.S. Cl.
CPC ... *H04N 21/2668* (2013.01); *H04N 21/21805* (2013.01); *H04N 21/2383* (2013.01);
(Continued)

(58) Field of Classification Search
CPC .... H04N 21/482; H04N 19/23; H04N 21/218; H04N 21/234327; H04N 19/597;
(Continued)

(56) References Cited

U.S. PATENT DOCUMENTS 7,164,714 B2  1/2007 Marlin
8,789,126 B1 *  7/2014 Nijim .................. H04N 21/4126
                                                          725/109
(Continued)

FOREIGN PATENT DOCUMENTS

EP  1233614  8/2002
EP  2485494  8/2012
(Continued)

OTHER PUBLICATIONS

Vetro et al., "Overview of the Stereo and Multiview Video Coding Extension of the H.264/MPEG-4 AVC Standard", 2011, IEEE.*
(Continued)

*Primary Examiner* — Kunal Langhnoja
(74) *Attorney, Agent, or Firm* — Merchant & Gould P.C.

(57) ABSTRACT

A method implemented on a broadcast headend system for providing video data for a privately defined channel selection mosaic includes defining at least one base layer channel from among a group of video channels, where the group of video channels includes candidate channels for selection as private mosaic preview channels, defining at least one other channel from among the group as an enhanced layer channel, defining at least one data block in at least one depending frame of the at least one enhanced layer channel as depending on at least one similar data block in at least one base frame of the base layer channel, encoding broadcast data from the group of video channels as an encoded group of video channels, where the at least one depending block is encoded as a function of the at least one similar data block, (Continued)

and transmitting the encoded group of video channels to at least one private mosaic user for assembly of the privately defined channel selection mosaic.

20 Claims, 4 Drawing Sheets

(51) Int. Cl.
  *H04N 21/4402* (2011.01)
  *H04N 21/431* (2011.01)
  *H04N 21/218* (2011.01)
  *H04N 21/2385* (2011.01)
  *H04N 21/2383* (2011.01)
  *H04N 21/25* (2011.01)
  *H04N 21/438* (2011.01)
  *H04N 21/475* (2011.01)
  *H04N 21/482* (2011.01)
  *H04N 21/81* (2011.01)

(52) U.S. Cl.
  CPC ....... *H04N 21/2385* (2013.01); *H04N 21/251* (2013.01); *H04N 21/4312* (2013.01); *H04N 21/4382* (2013.01); *H04N 21/440227* (2013.01); *H04N 21/4755* (2013.01); *H04N 21/4821* (2013.01); *H04N 21/816* (2013.01)

(58) Field of Classification Search
  CPC ............. H04N 19/172; H04N 21/2668; H04N 21/21805; H04N 21/440227; H04N 21/4755
  See application file for complete search history.

(56) References Cited

U.S. PATENT DOCUMENTS

| | | | | |
|---|---|---|---|---|
| 2002/0067376 | A1* | 6/2002 | Martin | G06Q 30/02 715/810 |
| 2007/0064800 | A1 | 3/2007 | Ha | |
| 2007/0204302 | A1 | 8/2007 | Calzone | |
| 2007/0250896 | A1 | 10/2007 | Parker et al. | |
| 2009/0083824 | A1 | 3/2009 | McCarthy et al. | |
| 2009/0228943 | A1 | 9/2009 | Ramaswamy et al. | |
| 2010/0115554 | A1 | 5/2010 | Drouet et al. | |
| 2010/0157016 | A1 | 6/2010 | Sylvain | |
| 2010/0158109 | A1* | 6/2010 | Dahlby | H04N 7/17318 375/240.03 |
| 2010/0171881 | A1 | 7/2010 | Castellan et al. | |
| 2011/0249177 | A1 | 10/2011 | Chen | |
| 2012/0050507 | A1 | 3/2012 | Keys | |
| 2012/0081515 | A1* | 4/2012 | Jang | H04N 5/45 348/43 |
| 2012/0269267 | A1* | 10/2012 | Choi | H04N 19/597 375/240.13 |
| 2013/0033642 | A1* | 2/2013 | Wan | H04N 19/39 348/495 |
| 2014/0049692 | A1* | 2/2014 | Sirpal | H04N 5/44 348/569 |
| 2014/0269930 | A1* | 9/2014 | Robinson | H04N 21/2365 375/240.24 |
| 2015/0016543 | A1* | 1/2015 | Rapaka | H04N 19/597 375/240.25 |

FOREIGN PATENT DOCUMENTS

| | | |
|---|---|---|
| WO | WO2006081577 | 8/2006 |
| WO | WO2008005383 | 1/2008 |

OTHER PUBLICATIONS

H.264 "Advanced video coding for generic audiovisual services (Annex H)" Jan. 2012.
WO International Search Report and Written Opinion published Feb. 6, 2014.
GB Combined Search and Examination Report dated May 17, 2013.
GB Examination Report dated Apr. 9, 2015.

* cited by examiner

SYSTEM AND METHOD FOR PROVIDING A PRIVATE MOSAIC

The present application is a § 371 submission of International Application No. PCT/IB2013/059907, which was filed on Nov. 5, 2013, which was published in the English language on May 15, 2014 with publication number WO2014/072901, and which claims the benefit of the filing date of GB 1220001.0, filed Nov. 7, 2012.

FIELD OF THE INVENTION

The present invention relates to the provision of a "mosaic" for channel preview and selection in general, and to facilitating private mosaics in particular.

BACKGROUND OF THE INVENTION

The following references are believed to represent the known state of the art:

US Patent Application Publication 2007/0250896 A1: "Picture in picture mosaic" of Alistair John Parker (Kramer);

US Patent Application Publication 2009/0228943 A1: "System and method for delivery of personalized mosaic multimedia content over cable data network" of Kumar Ramaswamy (Thomson);

U.S. Pat. No. 7,164,714: "Video transmission and processing system for generating a user mosaic" to Francois Martin;

US Patent Application Publication 2011/0249177 A1: "Method, apparatus and system for implementing mosaic TV service" of Juntao Chen;

US Patent Application Publication 2010/0115554 A1: "Intelligent TV mosaic for IP TV" of Francois Xavier Drouet;

US Patent Application Publication 2010/0171881 A1: "Generating of a customizable TV mosaic" of Pierre Yves Castellan; and "H.264 Advanced video coding for generic audiovisual services (Annex H)" January 2012, International Telecommunication Union, Telecommunication Standardization Sector (ITU-T).

SUMMARY OF THE INVENTION

There is provided in accordance with an embodiment of the present invention a method implemented on a broadcast headend system for providing video data for a privately defined channel selection mosaic, the method including: defining at least one base layer channel from among a group of video channels, where the group of video channels includes candidate channels for selection as private mosaic preview channels, defining at least one other channel from among the group as an enhanced layer channel, defining at least one data block in at least one depending frame of the at least one enhanced layer channel as depending on at least one similar data block in at least one base frame of the base layer channel, encoding broadcast data from the group of video channels as an encoded group of video channels, where the at least one depending block is encoded as a function of the at least one similar data block, and transmitting the encoded group of video channels to at least one private mosaic user for assembly of the privately defined channel selection mosaic.

Further, in accordance with an embodiment of the present invention, the encoding is performed with multi-view video compression (MVC).

Still further, in accordance with an embodiment of the present invention, the method also includes grouping the group of video channels based on viewing profiles as indicated by statistical analysis of viewing statistics.

Additionally, in accordance with an embodiment of the present invention, the method also includes grouping the group of video channels based on similarity of video data broadcast on the video channels.

Moreover, in accordance with an embodiment of the present invention, the group of video channels is definable by at least manual input.

Further, in accordance with an embodiment of the present invention, the method also includes scaling the broadcast data as required for the private mosaic.

Still further, in accordance with an embodiment of the present invention, the transmitting is via at least one of a satellite, cable and an IP connection.

There is also provided in accordance with an embodiment of the present invention a system for providing video data for a privately defined channel selection mosaic, the method including: means for defining at least one base layer channel from among a group of video channels, where the group of video channels includes candidate channels for selection as private mosaic preview channels, means for defining at least one other channel from among the group as an enhanced layer channel, means for defining at least one data block in at least one depending frame of the at least one enhanced layer channel as depending on at least one similar data block in at least one base frame of the base layer channel, means for encoding broadcast data from the group of video channels as an encoded group of video channels, where the at least one depending block is encoded as a function of the at least one similar data block, and means for transmitting the encoded group of video channels to at least one private mosaic user for assembly of the privately defined channel selection mosaic.

There is also provided in accordance with an embodiment of the present invention a method for displaying a private channel selection mosaic on a video playing device, the method including tuning to a transmission including encoded base layer data for at least one base layer mosaic video channel, where the base layer mosaic video channel is selected for the private channel selection mosaic, receiving the transmission, decoding the encoded base layer data to produce at least one base layer video stream, decoding encoded dependent layer data as a function of the decoded base layer data to produce at least one dependent layer video stream, where the encoded dependent layer data is associated with at least one dependent layer mosaic video channel selected for the private channel selection mosaic, and the dependent layer mosaic video channel is defined as dependent on the base layer mosaic video channel, and displaying at least the base layer video stream and the at least one dependent layer video stream as the private channel selection mosaic.

Further, in accordance with an embodiment of the present invention, the method also includes tuning to a transmission including the encoded dependent layer data.

Still further, in accordance with an embodiment of the present invention, the displaying includes formatting the base layer video stream and dependent layer video stream in accordance with at least user preferences for the private channel selection mosaic, where the user preferences are at least one of desired resolution, size, and location of the video streams in the private channel selection mosaic.

Additionally, in accordance with an embodiment of the present invention, the method also includes enabling a user to define the user preferences.

Moreover, in accordance with an embodiment of the present invention, the encoded base layer data and encoded dependent layer data is compressed with multi-view video compression (MVC).

There is also provided in accordance with an embodiment of the present invention a private mosaic generation system implemented on a computing device, the system including a mosaic compressor unit operative to produce an encoded group of candidate channels for selection as private mosaic preview channels, where at least one of the group of candidate channels is defined as a base channel, and at least one of the group of candidate channels is defined as an enhanced channel depending on the base channel, where at least one data block from the enhanced channel is encoded as a function of a data block from the base channel, and a transmitter operative to transmit the encoded group of video channels to at least one private mosaic user for assembly of the privately defined channel selection mosaic.

Further, in accordance with an embodiment of the present invention, the system also includes a dependency determining unit operative to determine which of the group of candidate channels is to be defined as the base channel and which of the group of candidate channels is to be defined as the enhanced channel depending on the base channel.

Still further, in accordance with an embodiment of the present invention, the mosaic compressor unit includes a service ID router operative to route the group of candidate channels for encoding from a data stream of broadcast data, a resolution setup module operative to setup a desired resolution for each of the group of candidate channels and to tune and scale associated videos in accordance with a desired resolution, and at least one video encoder operative to encode the group of candidate channels.

Additionally, in accordance with an embodiment of the present invention, the at least one video encoder is operative to encode using MVC encoding.

Moreover, in accordance with an embodiment of the present invention, the transmitter is operative to transmit via at least one of satellite, cable and an IP connection.

There is also provided in accordance with an embodiment of the present invention a system for displaying a private channel selection mosaic on a video playing device, the system including means for tuning to a transmission including encoded base layer data for at least one base layer mosaic video channel, where the base layer mosaic video channel is selected for the private channel selection mosaic, means for receiving the transmission, means for decoding the encoded base layer data to produce at least one base layer video stream, means for decoding encoded dependent layer data as a function of the decoded base layer data to produce at least one dependent layer video stream, where the encoded dependent layer data is associated with at least one dependent layer mosaic video channel selected for the private channel selection mosaic, and the dependent layer mosaic video channel is defined as dependent on the base layer mosaic video channel, and means for displaying at least the base layer video stream and the at least one dependent layer video stream as the private channel selection mosaic.

There is also provided in accordance with an embodiment of the present invention a media broadcast player including a video decoder configured to enable decoding of an encoded group of candidate channels for selection as private mosaic preview channels, where at least one of the group of candidate channels is defined as a base channel, and at least one of the group of candidate channels is defined as an enhanced channel depending on the base channel, and at least one data block from the enhanced channel is encoded as a function of a data block from the base channel, a layout composer to compose a layout for displaying at least the base channel and the enhanced channel in a private mosaic of preview channels, and a display operative to display the private mosaic of preview channels.

Further, in accordance with an embodiment of the present invention, the video decoder is operative to decode MVC encoded broadcast data.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

A TV channel "mosaic" provides a viewer with a split screen view of multiple channels as they are broadcast. Typically, such mosaics are limited to one or more sets of predefined channels chosen by the broadcaster. A headend component composes the channels as a single encoded video stream, to be broadcast to the viewers. Understandably, as mosaic broadcasts therefore effectively compete with "regular" full screen programming broadcasts for available bandwidth, it may not be feasible to include all available channels or combinations of channels in such mosaic broadcasts.

Applicant has realized that television viewers may prefer to define "private" mosaics according to their personal preferences in order to enhance the channel preview and selection process. In such manner, instead of receiving a standard mosaic that may typically include a sampling of the most popular channels offered by the broadcaster, a viewer may use a private mosaic to view and select from the viewer's personal favorite channels. For example, a sports enthusiast may include several sports channels in his/her private mosaic, even though a ratings driven standard mosaic may offer only one or two such channels.

Unfortunately, despite the convenience of a private mosaic, the dedicated bandwidth necessary to send even low resolution viewing data for every available channel may render the idea cost-prohibitive. A practical implementation of a private mosaic option may therefore require a solution for compressing the necessary data to the extent that transmitting it would not require significant investment in additional infrastructure. As will be described hereinbelow, a suitable compression method may be employed to significantly reduce the bandwidth necessary for transmitting the required data.

Figure 1:
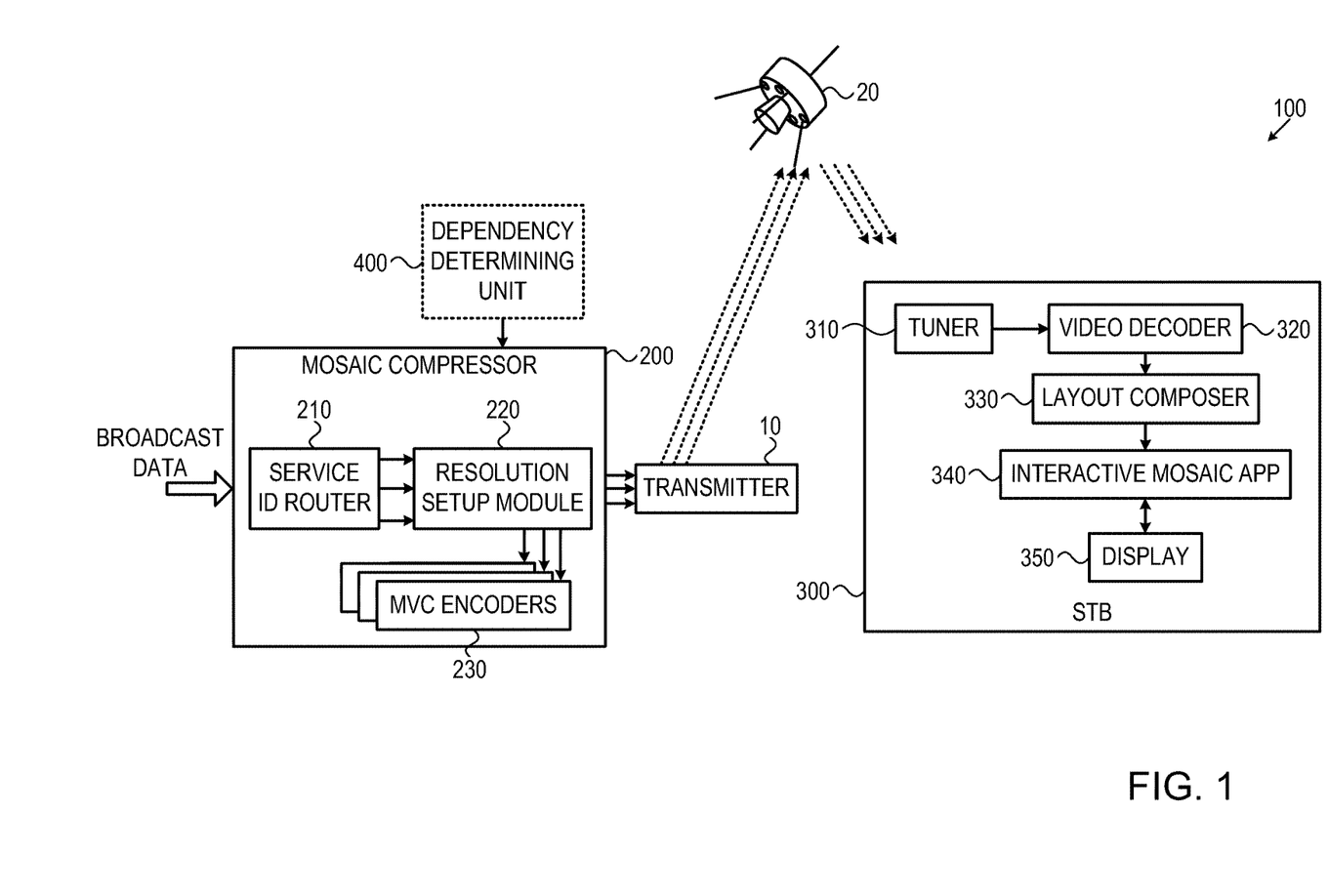
FIG. 1 is a simplified schematic illustration of a private mosaic generation and display system, constructed and operative in accordance with an embodiment of the present invention.

Reference is now made to FIG. 1 which illustrates a novel private mosaic generation and display system 100, constructed and operative in accordance with an embodiment of the present invention. System 100 may comprise mosaic compressor 200 and exemplary set-top box (STB) 300. It will be appreciated that mosaic compressor 200 may be implemented as part of a broadcast headend system. As will be described hereinbelow, mosaic compressor 200 may be configured to process input broadcast data to produce compressed versions to be uploaded via transmitter 10 to satellite 20 to be broadcast to STB 300 where it may be assembled as a private mosaic as per a viewer's individual requirements. It will be appreciated that the use of satellite 20 as the broadcast mechanism for system 100 may be exemplary; system 100 may also be configured to transmit using cable and/or broadband IP transmission instead of, or in addition to, satellite 20. It will further be appreciated that in the interests of clarity, only one STB 300 may be depicted; in an actual implementation, a multiplicity of STBs 300 may be deployed. Persons skilled in the art will also appreciate that, an STB 300 is used by way of example only; the present invention is not limited to a particular type of STB, but rather includes any suitable device for the receipt and play of media broadcasts, such as, for example, an STB, PVR, handheld device or personal computer.

Figure 2A:
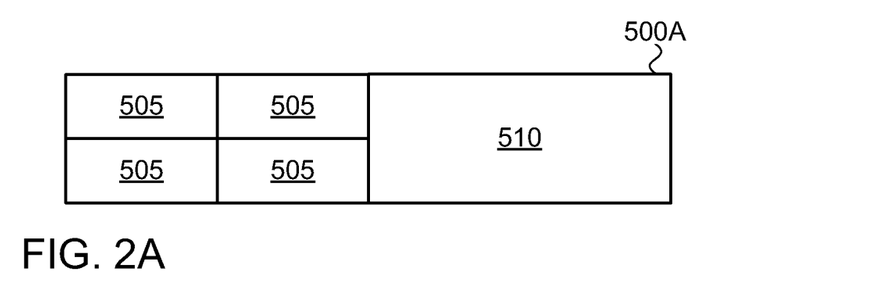
FIGS. 2A-2C are simplified pictorial illustrations of exemplary private mosaics that may be defined by a user of the system of FIG. 1.
Figure 2B:
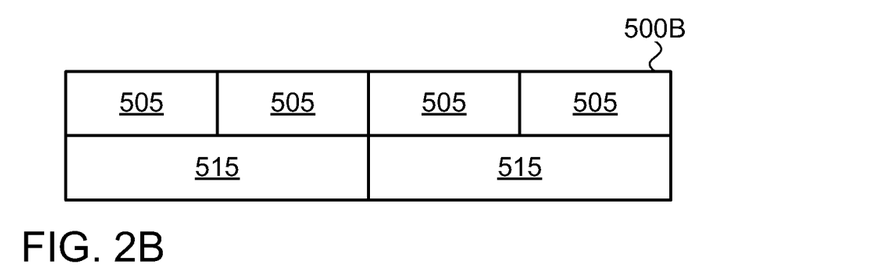
Figure 2C:
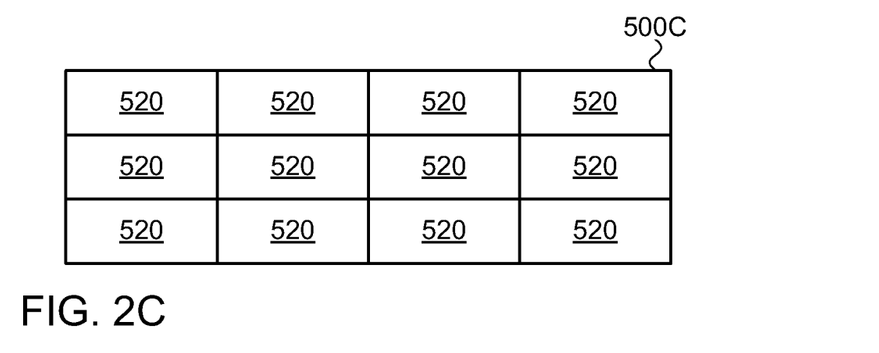

Reference is now made to FIGS. 2A, 2B, and 2C, each of which depicts an exemplary private mosaic 500 that may be defined by a user of system 100. It will be appreciated that the channels included in private mosaics may be displayed in different sizes, formats and resolutions. For example, in private mosaic 500A, a total of five channels may be displayed. Private mosaic 500A may feature four preview channels 505, each of which allocated one eighth of the available screen space and aligned on the left of the mosaic screen; a single preview channel 510 may be allocated the remaining half of the mosaic screen. In private mosaic 500B four preview channels 505 may be aligned across the top half of the mosaic screen and two preview channels 515, may be aligned across the bottom. In private mosaic 500C, the mosaic screen may be evenly divided between twelve preview channels 520.

It will be appreciated that other formats may be defined for private mosaics 500. It will also be appreciated that system 100 may be configured to enable the viewer to select or define different resolutions for the display of channels 505, 510, 515 and 520.

Figure 3A:
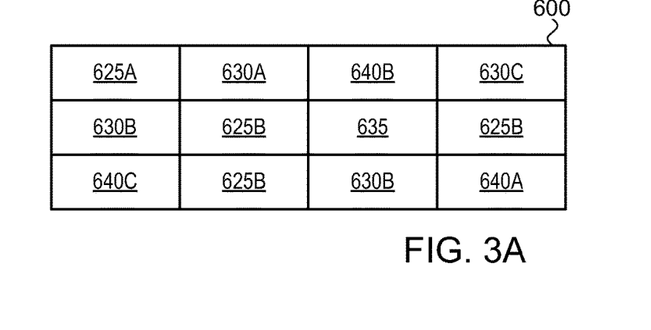
FIG. 3A is an alternative representation of the exemplary private mosaic of FIG. 2C.

It will be appreciated that there may be inherent relationships between the channels available for inclusion in a private mosaic 500. For example, channels may be related by areas of interest, such as sports, documentaries or comedy. Channels may similarly be related by language or country of origin in multilingual or multiethnic regions. Such relationships tend to be indicators of the likelihood that a given channel may be selected for a private mosaic. For example, given that one sports channel may have been selected for inclusion in private mosaic 500, it may be more likely that the viewer will select a second sports channel as well. In such manner, private mosaics 500 may be composed of groups of related channels. Reference is now made to FIG. 3A, which shows an exemplary private mosaic 600 in a format similar to that of private mosaic 500C in FIG. 2C. Preview channels 625 may represent preview channels related to a common interest, such as, for example, sports.

Preview channels 630 may similarly represent news channels; preview channel 635 may represent a foreign language channel; and preview channels 640 may represent movie channels.

These groups may be used to implement a compression method, such as multi-view video compression (MVC), an amendment to the H.264/MPEG-4 AVC video compression standard that uses hierarchal, synchronized video encoding to enable efficient encoding of sequences captured simultaneously from multiple cameras using a single video stream. While MVC may have been intended for combining different camera views of a common scene into a single video stream, it may also be suitable for effectively compressing video data streams from related preview channels. MVC may have initially been conceived to address the similarities between different views of the same object as captured by multiple cameras. However, Applicant has realized, based on observation, that encoders may tend to find similarities between "different" high resolution pictures even when they may not be of the same object. Accordingly, MVC may be suitable for encoding groups of preview channels even though they may be broadcasting nominally dissimilar video streams.

Multi-view video may tend to contain a large amount of inter-view dependencies, since multiple cameras may capture the same scene from different viewpoints. Using these interdependencies, a frame from a certain camera may be predicted not only from temporally related frames from the same camera, but also from the frames of neighboring cameras, thus facilitating efficient combined temporal and inter-view prediction via MVC encoding.

It will be appreciated that any suitable compression method that uses hierarchal synchronized video encoding to encode multiple sequences into a single video stream may be used instead of MVC. For example, H.265 (HEVC) is expected to include functionality similar to MVC. System 100 and STB 300 may be configured to use such functionality instead of, or in addition to, MVC. The use of MVC as described hereinbelow may therefore also be understood to pertain to other compression methods that may have the same general functionality.

Returning briefly to FIG. 1, system 100 may also comprise dependency determining unit 400 that may be configured to define dependencies between selected preview channels that may be used to facilitate MVC encoding. Any suitable system or method may be used to implement the functionality of unit 400. For example, a statistical model may be employed to identify preview channel groupings from user preferences based on actual viewing statistics. Such a statistical model may use publicly available audience/market share statistics such as Nielsen ratings to identify preview channels based on popularity. For example, preview channels with high ratings may be grouped together on the assumption that popular channels are likely to be chosen for private mosaics. Such a statistical model may also use regression analysis on actual viewing statistics as recorded by the broadcaster to identify groups of preview channels that may be of common interest to a segment of viewers. The statistical model may generate binary trees of preview channels where given a starting preview channel, succeeding branches of the tree may be populated by the preview channels most likely to be viewed by viewers of the preceding preview channel. An exemplary starting preview channel may be defined according to a popular channel as indicated by ratings or any other suitable method.

Alternatively or additionally, unit 400 may at least in part define dependencies between preview channels according to channel packages marketed by the broadcaster. Such packages typically comprise bundles of premium channels provided for an additional fee. The channels are typically bundled on the basis of similarity. For example, channel package may comprise several channels with sports programming, movies, a specific language, etc. It follows therefore that viewers of one of the channels in the package would be likely to view the other channels as well. The order of the dependency may be at least in part based on a statistic models as discussed hereinabove.

Alternatively or additionally, unit 400 may analyze the actual content of the preview channels to group preview channels with similar broadcast data. For example, sports channels and nature channels may tend to broadcast video images with relatively high rates of green pixels; video data for sports stadiums and video data for rain forests may therefore have a relatively high degree of similarity on a granular level even if the overall images may be markedly dissimilar. Alternatively or additionally, the functionality of dependency determining unit 400 may be augmented or replaced by manual input.

Figure 3B:
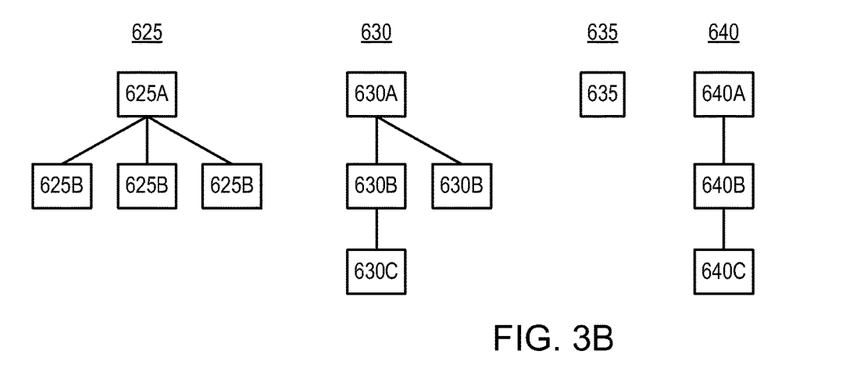
FIG. 3B is a schematic illustration of an exemplary dependency mapping of the preview channel relationships of the private mosaic of FIG. 3A.

FIG. 3B, to which reference is now made, illustrates an exemplary dependency mapping of the preview channel relationships shown in FIG. 3A, such as may be generated by unit 400. It will be appreciated that the mapping is presented as an example and does not limit the present invention. Each group of the preview channels from FIG. 3A may be mapped as a "chain" of preview channels. In chain 625, preview channels 625B may depend on preview channel 625A. In chain 630, preview channels 630B may depend on preview channel 630A, and preview channel 630C may depend on one of preview channels 630B. Chain 635 may have only preview channel 635 as it may have no dependents. In chain 640, preview channel 640C may depend on preview channel 640B which in turn may depend on preview channel 640A.

Figure 4:
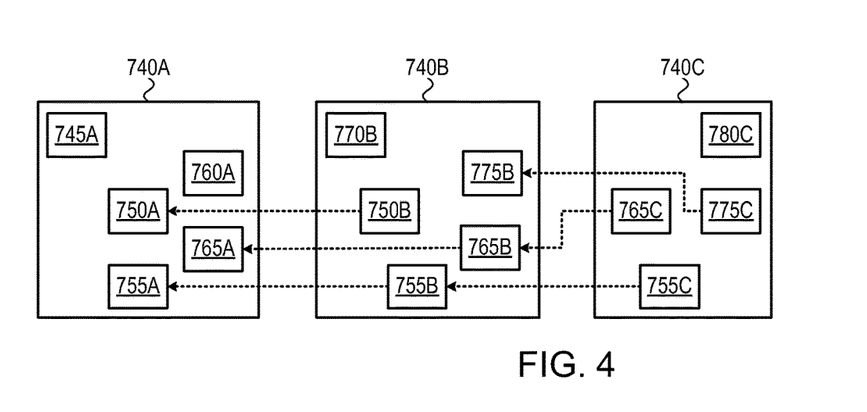
FIG. 4 is a schematic illustration of exemplary dependent relationships between exemplary frames of a chain of preview channels from FIG. 3B.

It will be appreciated that MVC encoding may include definition of dependencies at a lower level that those represented in FIGS. 3A and 3B. Reference is now made to FIG. 4 which shows exemplary dependent relationships between exemplary frames of a chain of preview channels such as chain 640 from FIG. 3B. Frames 740A, 740B and 740C may represent exemplary frames from the broadcast channels to which preview channels 640A, 640B and 640C may be associated respectively. For the purposes of MVC encoding, preview channel 640A may be defined as the "base" layer, and depending preview channels 640B and 640C may defined as "enhanced" layers that may be encoded as a function of the base layer. Accordingly, frame 740A may be encoded independently, whereas frame 740B may be encoded in terms of its "enhancement" of its associated base layer, e.g. frame 740A. Similarly, frame 740C may be encoded in terms of its enhancement of frame 740B. It will be appreciated that frames 740 may be broadcast generally in parallel.

Frame 740A may comprise data blocks 745A, 750A, 755A, 760A and 765A. Similarly, frame 740B may comprise data blocks 750B, 755B, 765B, 770B and 775B, and frame 740C may comprise data blocks 755C, 765C, 775B and 780C. It will be appreciated that frames 740 may comprise other data blocks that may not be represented in FIG. 4 in the interests of clarity. It will similarly be appreciated that the present invention may be configured to support different sizes of such data blocks.

Frame 740A may be associated with preview channel 640A which may not be dependent on any other frame as per the mapping in FIG. 3B. Accordingly, the data blocks in frame 740A may not be dependent on any data blocks in frames 740B or 740C. It will be appreciated, however, that a data block in a given frame 740 may be dependent on another data block in the same frame 740. Accordingly, a data block in frame 740A may depend on another data block in frame 740A. Similarly, a data block may be dependent on a data block in a previous or subsequent frame 740 associated with the same preview channel 640.

As shown in FIG. 3B, preview channel 640B may depend on preview channel 640A. It will be appreciated that this dependency may not be predicated on any similarities between the images and video broadcast on preview channels 640A and 640B. However, an MVC encoder may still detect sufficient similarity between component data blocks to define a dependency that may be used as a basis for representing the depending data block. For example, an encoder may use a data block size of 4×4 pixels. At such a low level resolution, there may be many points of similarity between two images that may not be at all similar when viewed as a whole. Accordingly, data blocks from frame 740B may be defined as depending on data blocks in frame 740A, even though the overall image of frame 740A may be markedly dissimilar from that of frame 740B.

For example, data bock 750B may be defined as depending on data block 750A; data block 755B may depend on data block 755A; and data block 765B may depend on data block 765A. It will be appreciated that the location within frame 740B of the depending data blocks may not necessarily be related to the location of the data blocks on which they depend in frame 740A. It will further be appreciated that not all of the data blocks in frame 740B may depend on data blocks in frame 740A. For example, data blocks 770B and 775B may not depend on any data blocks in frame 740A.

Similarly, some, if not necessarily all, of the data blocks in frame 740C may depend on data blocks in frame 740B. For example, data block 755C may depend on data block 755B; data block 765C may depend on data block 765B; and data block 775C may depend on data block 775B. Data block 780C may not depend on any data block in frame 740B.

Figure 5:
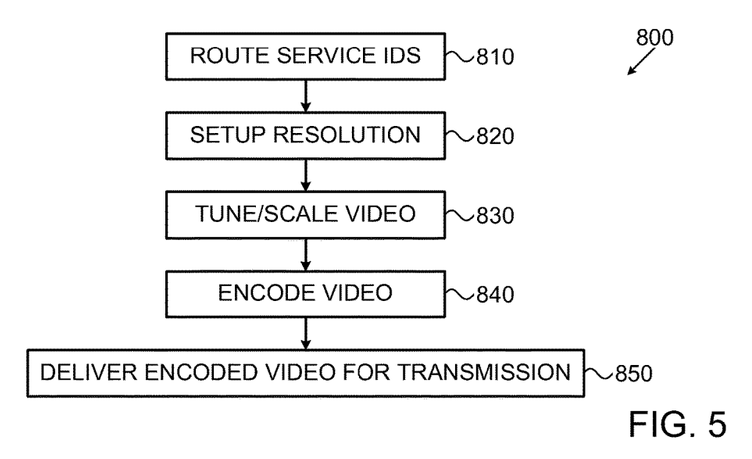
FIGS. 5 and 6 are block diagrams of processes to be performed by the system of FIG. 1.

Reference is now also made to FIG. 5 which illustrates a novel private mosaic compression process to be performed by mosaic compressor 200. Returning briefly to FIG. 1, mosaic compressor 200 may comprise service ID router 210, resolution setup module 220 and MVC encoders 230.

Service ID router 210 may route (step 810) service IDs (from among the broadcast data transmitted by the headend) associated with a set of target preview channels to resolution setup module 220. For example, service ID router 210 may route the service IDs associated with preview channels 640 from FIGS. 3A and 3B. Resolution setup module 220 may setup (step 820) a desired resolution for each preview channel 640 and then tune and scale (step 830) the associated videos in accordance with the desired resolution as may be required. MVC encoders 230 may encode (step 840) each video using MVC encoding. It will be appreciated that frames 740A of preview channel 640A may be defined as base layers for the encoding of step 840, whereas frames 740B and 740C may be enhanced layers depending directly (frames 740B) or indirectly (frame 740C via frame 740B) on the base layers of frames 740A.

The encoded videos may be delivered for transmission to transmitter 10. It will be appreciated that the depiction of system 100 with satellite 20 may be exemplary; the present invention may also include embodiments wherein the headend broadcasts some or all content via cable and/or an IP connection. The encoded videos may transmitted by whatever means available in system 100. In accordance with some embodiments of the present invention, the more popular preview channels may be broadcast or multicast, whereas the less popular, niche channels may be unicast to save bandwidth. It will also be appreciated that system 100 may also be configured with encoding functionality for encoding its regular service broadcast data for transmission to STBs 300. This functionality may or may not be implemented within the framework of MVC encoders 230.

Figure 6:
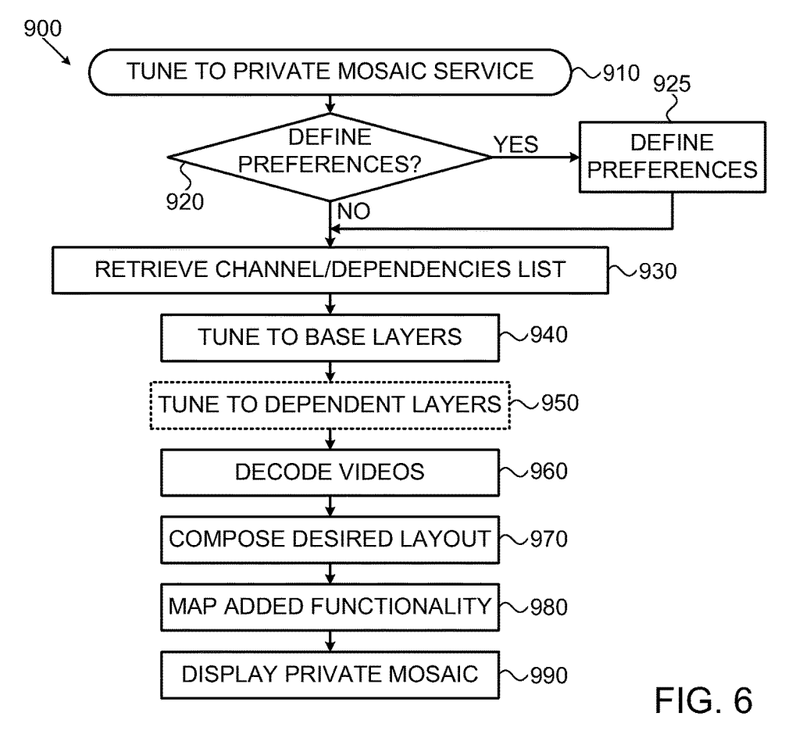

Reference is now made to FIG. 6 which illustrates a novel private mosaic display process to be performed on STB 300. As shown in FIG. 1, STB 300 may comprise tuner 310, video decoder 320, layout composer 330, interactive mosaic app 340 and display 350. In response to a viewer's request, tuner 310 may be tuned (step 910) to the private mosaic service as transmitted from satellite 20. It will be appreciated that tuner 310 may also be configured to tune to transmissions received via cable and/or IP connection. If an option for defining preferences for the channels and layout of the private mosaic is selected (step 920), interactive application 340 may be initiated to facilitate the defining (step 925) of such preferences. It will be appreciated that any suitable functionality may be used for such definition.

Processing may continue with STB 300 retrieving (step 930) the preference settings for the selected preview channels and their associated dependency data. Tuner 210 may tune (940) to the required frequency to receive the required base layers. Tuner 210 may also tune (950) to receive the required dependent layers. It will be appreciated that step 950 may not be required for preview channels that are defined as base layers; however, in practice it may be likely that at least some of the selected preview channels in a private mosaic will be defined in terms of enhanced layers. It will similarly be appreciated that STB 300 may be configured with multiple tuners 310, each of which may or may not be configured for use in the context of process 900.

The encoded video signals may be decoded (step 960) by one or more video encoders 320. Layout composer 330 may compose (step 970) the private mosaic layout as per the configuration and resolutions defined in step 925. STB 300 may map (step 980) added functionality, such as interactive mosaic application 340 on top of the composed layout. Display 350 may display (step 990) the private mosaic to the user for viewing while running application 340.

It will be appreciated that throughout the present specification and claims the term "encoded", in all of its grammatical forms, may refer to any type of data stream encoding including, for example and without limiting the scope of the definition, well known types of encoding such as, but not limited to, MPEG-2 encoding, H.264 encoding, VC-1 encoding, and synthetic encodings such as high efficiency video coding (HEVC), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" as used throughout the present specification and claims, in all of its grammatical forms, may refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" may be used throughout the present specification and claims, in all their grammatical forms, to refer to the reverse of "encoded" and "compressed" in all their grammatical forms.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:
1. A method for providing video data for a privately defined channel selection mosaic, said method comprising:
    defining at least one base layer channel from among a group of video channels, wherein said group of video channels includes candidate channels for selection as private mosaic preview channels;
    creating a dependency mapping of said group of video channels, said dependency mapping comprising a binary tree having said at least one base layer channel as a root node and succeeding branches comprising preview channels most likely to be viewed by viewers of a preceding preview channel;
    defining each of said preview channels of said succeeding branches as an enhanced layer channel;
    defining at least one data block in at least one depending frame of said enhanced layer channel as depending on at least one similar data block in at least one base frame of said preceding preview channel;
    encoding from said group of video channels as an encoded group of video channels based on hierarchical synchronized video encoding, wherein encoding said group of video channels based on hierarchical synchronized video encoding comprises encoding said enhanced layer channel as a function of said preceding preview channel, and wherein encoding said enhanced layer channel as a function of said preceding preview channel comprises encoding said at least one depending block of said at least one depending frame of said enhanced layer channel as a function of said at least one similar data block of said at least one base frame of said preceding preview channel; and transmitting said encoded group of video channels to at least one private mosaic user device for assembly of said privately defined channel selection mosaic.

2. The method according to claim 1 and also comprising grouping said group of video channels based on viewing profiles as indicated by statistical analysis of viewing statistics.

3. The method according to claim 1 and also comprising grouping said group of video channels based on similarity of video data broadcast on video channels in said group of video channels.

4. The method according to claim 1 wherein said group of video channels is definable by at least manual input.

5. The method according to claim 1, further comprising: scaling broadcast data from said encoded group of video channels as required for said privately defined channel selection mosaic.

6. The method according to claim 1 wherein said transmitting is via at least one of a satellite, cable or an IP connection.

7. The method according to claim 1 wherein said encoding is performed with multi-view video compression (MVC).

8. The method according to claim 1, wherein said encoding using said hierarchal synchronized video encoding comprises encoding said group of video channels into a single video stream.

9. A private mosaic generation system comprising:
a memory; and
a processor configured to execute instructions stored in said memory, said instructions comprising:
defining a base channel from among a group of candidate channels for selection as private mosaic preview channels;
creating a dependency mapping of said group of candidate channels, said dependency mapping comprising a binary tree having said base channel as a root node and succeeding branches comprising preview candidate channels most likely to be viewed by viewers of a preceding preview candidate channel;
defining each of said preview channels of said succeeding branches as an enhanced channel;
defining at least one data block in at least one depending frame of said enhanced channel as depending on at least one similar data block in at least one base frame of said preceding preview channel;
encoding from said group of candidate channels as an encoded group of candidate channels based on hierarchical synchronized video encoding, wherein encoding said group of candidate channel based on hierarchical synchronized video encoding comprises encoding said enhanced channel as a function of said preceding preview channel, and wherein encoding said enhanced channel as a function of said preceding preview channel comprises encoding said at least one depending block of said at least one depending frame of said enhanced channel as a function of said at least one similar data block of said at least one base frame of said preceding preview channel; and
transmitting said encoded group of candidate channels to at least one private mosaic user device for assembly of a privately defined channel selection mosaic.

10. The system according to claim 9, wherein said instructions further comprising determining which of said encoded group of candidate channels is to be defined as said base channel and which of said encoded group of candidate channels is to be defined as said enhanced channel depending on said base channel.

11. The system according to claim 9, wherein said instructions comprising:
routing said encoded group of candidate channels for encoding from a data stream of broadcast data; and
setting a desired resolution for each of said group of candidate channels and to tune and scale associated videos in accordance with a desired resolution.

12. The system according to claim 11, wherein said encoding comprises using MVC encoding.

13. The system according to claim 9, wherein said encoded group of candidate channels is transmitted via at least one of satellite, cable or an IP connection.

14. The system according to claim 9, wherein said system is part of a broadcast headend.

15. A non-transitory computer readable medium that stores a set of instructions which when executed perform a method comprising:
defining a base channel from among a group of candidate channels;
creating a dependency mapping of said group of candidate channels, said dependency mapping comprising a binary tree having said base channel as a root node and succeeding branches comprising preview channels most likely to be viewed by viewers of a preceding preview channel;
defining each of said preview channels of said succeeding branches as an enhanced channel;
defining at least one data block in at least one depending frame of said enhanced channel as depending on at least one similar data block in at least one base frame of said preceding preview channel;
encoding from said group of candidate channels based on hierarchical synchronized video encoding, wherein encoding said group of candidate channel based on hierarchical synchronized video encoding comprises encoding said enhanced channel as a function of said preceding preview channel, and wherein encoding said enhanced channel as a function of said preceding preview channel comprises encoding said at least one depending block of said at least one depending frame of said enhanced channel as a function of said at least one similar data block of said at least one base frame of said preceding preview channel; and
transmitting said encoded group of candidate channels to at least one private mosaic user device for assembly of a privately defined channel selection mosaic.

16. The non-transitory computer-readable medium of claim 15, wherein said group of candidate channels are encoded into a single video stream.

17. The non-transitory computer-readable medium of claim 15, wherein said encoding is performed with multi-view video compression (MVC).

18. The non-transitory computer-readable medium of claim 15, wherein said method further comprising scaling broadcast data from said encoded group of candidate channels as required for said privately defined channel selection mosaic.

19. The non-transitory computer-readable medium of claim 15, wherein said group of candidate channels are grouped based on similarity of video data broadcast on video channels.

20. The non-transitory computer-readable medium of claim 15, wherein said group of candidate channels are grouped based on viewing profiles as indicated by statistical analysis of viewing statistics.

\* \* \* \* \*